United States Patent
Lee et al.

(10) Patent No.: US 9,560,272 B2
(45) Date of Patent: Jan. 31, 2017

(54) ELECTRONIC DEVICE AND METHOD FOR IMAGE DATA PROCESSING

(71) Applicant: Samsung Electronics Co., Ltd., Gyeonggi-do (KR)

(72) Inventors: Seung Eun Lee, Seoul (KR); Jeong Min Park, Gyeonggi-do (KR); Seung Young Jeon, Gyeonggi-do (KR); Eun Jung Hyun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 14/323,930

(22) Filed: Jul. 3, 2014

(65) Prior Publication Data

US 2015/0271396 A1    Sep. 24, 2015

(30) Foreign Application Priority Data

Mar. 24, 2014  (KR) .................. 10-2014-0033797

(51) Int. Cl.
*H04N 5/232* (2006.01)
*H04N 5/225* (2006.01)
(Continued)

(52) U.S. Cl.
CPC .......... *H04N 5/23229* (2013.01); *G06F 3/017* (2013.01); *G06F 3/0304* (2013.01); *G09B 19/0092* (2013.01); *H04N 5/2257* (2013.01); *H04N 5/23216* (2013.01); *H04N 9/07* (2013.01); *G06F 2203/04806* (2013.01)

(58) Field of Classification Search
CPC ........ G06F 3/017; G06F 3/0304; G06F 3/011; G06F 3/005; G06F 3/0426; G06F 3/04845; G02B 2027/0138; G02B 2027/014; H04N 5/23293; H04N 5/23216; H04N 5/23212; H04N 5/23296; H04N 5/23219; H04N 5/23229; H04N 5/23254; G06K 9/00355; G06K 9/00335

See application file for complete search history.

(56) References Cited

U.S. PATENT DOCUMENTS 6,160,899 A  * 12/2000  Lee .................. G06F 3/017
                                              348/77
6,346,929 B1 *  2/2002  Fukushima ........ G06F 3/017
                                              345/156

(Continued)

FOREIGN PATENT DOCUMENTS

EP    2 843 510 A2    3/2015
JP    2004-078977     3/2004
(Continued)

OTHER PUBLICATIONS

Extended European Search Report dated Sep. 4, 2015 in connection with European Patent Application No. 14178202.9; 11 pages.
(Continued)

*Primary Examiner* — Michael Osinski

(57) ABSTRACT

An electronic device for processing image data including a camera module configured to obtain the image data. The electronic device also including a control module configured to set at least one pointing object in the image data and configured to control the image data on an object corresponding to a position of the set pointing object according to at least one of a position and movement of the at least one pointing object.

20 Claims, 12 Drawing Sheets

(51) Int. Cl.
*H04N 9/07* (2006.01)
*G09B 19/00* (2006.01)
*G06F 3/01* (2006.01)
*G06F 3/03* (2006.01)

(56) References Cited

U.S. PATENT DOCUMENTS

| | | | |
|---|---|---|---|
| 6,353,428 B1* | 3/2002 | Maggioni | G06F 3/0425 |
| | | | 345/157 |
| 6,454,419 B2* | 9/2002 | Kitazawa | H04N 5/74 |
| | | | 348/E5.137 |
| 7,015,950 B1* | 3/2006 | Pryor | G06F 3/017 |
| | | | 348/207.11 |
| 7,487,468 B2* | 2/2009 | Tanaka | H04N 5/272 |
| | | | 345/156 |
| 7,893,920 B2 | 2/2011 | Endoh | |
| 8,203,502 B1* | 6/2012 | Chi | G02B 27/017 |
| | | | 345/7 |
| 8,237,654 B2* | 8/2012 | Kang | G06F 3/023 |
| | | | 345/156 |
| 8,558,759 B1 | 10/2013 | Prada Gomez et al. | |
| 8,736,689 B2* | 5/2014 | Sugimoto | H04N 5/232 |
| | | | 348/208.14 |
| 8,912,979 B1* | 12/2014 | Gomez | G09G 3/001 |
| | | | 345/7 |
| 9,024,842 B1 | 5/2015 | Prada Gomez et al. | |
| 9,110,502 B2* | 8/2015 | Fink | G06F 3/012 |
| 2001/0022861 A1* | 9/2001 | Hiramatsu | G06F 3/0425 |
| | | | 382/291 |
| 2002/0097247 A1* | 7/2002 | Ohba | G06F 3/011 |
| | | | 345/501 |
| 2005/0094019 A1 | 5/2005 | Grosvenor et al. | |
| 2005/0195277 A1* | 9/2005 | Yamasaki | G02B 27/017 |
| | | | 348/61 |
| 2005/0206748 A1* | 9/2005 | Kato | H04N 5/232 |
| | | | 348/231.99 |
| 2005/0248529 A1 | 11/2005 | Endoh | |
| 2006/0168523 A1* | 7/2006 | Yoda | G06F 3/017 |
| | | | 715/728 |
| 2007/0064140 A1* | 3/2007 | Kitaura | G06F 3/011 |
| | | | 348/333.01 |
| 2009/0073117 A1* | 3/2009 | Tsurumi | G06F 3/005 |
| | | | 345/158 |
| 2009/0122010 A1* | 5/2009 | Murai | G06F 3/017 |
| | | | 345/158 |
| 2009/0135135 A1* | 5/2009 | Tsurumi | G06F 3/017 |
| | | | 345/156 |
| 2009/0153476 A1* | 6/2009 | Kang | G06F 3/023 |
| | | | 345/157 |
| 2009/0153671 A1* | 6/2009 | Lee | G06F 3/0304 |
| | | | 348/207.1 |
| 2009/0244357 A1* | 10/2009 | Huang | H04N 5/23293 |
| | | | 348/345 |
| 2010/0066840 A1* | 3/2010 | Asukai | G06T 5/50 |
| | | | 348/207.1 |
| 2010/0321533 A1* | 12/2010 | Park | G06F 3/0481 |
| | | | 348/239 |
| 2011/0199387 A1 | 8/2011 | Newton | |
| 2012/0032874 A1* | 2/2012 | Mukawa | G02B 3/12 |
| | | | 345/8 |
| 2012/0249854 A1* | 10/2012 | Miyakawa | H04N 5/23212 |
| | | | 348/333.01 |
| 2012/0280903 A1* | 11/2012 | Fink | G06F 3/012 |
| | | | 345/156 |
| 2013/0002724 A1* | 1/2013 | Heinrich | G06F 1/163 |
| | | | 345/676 |
| 2013/0038759 A1* | 2/2013 | Jo | H04N 5/2256 |
| | | | 348/240.99 |
| 2013/0044193 A1 | 2/2013 | Kulkarni | |
| 2013/0044912 A1 | 2/2013 | Kulkarni et al. | |
| 2013/0050069 A1* | 2/2013 | Ota | G06F 3/011 |
| | | | 345/156 |
| 2013/0063345 A1* | 3/2013 | Maeda | G06F 3/017 |
| | | | 345/156 |
| 2013/0123068 A1* | 5/2013 | Sultan | A63B 24/0062 |
| | | | 482/2 |
| 2013/0203024 A1* | 8/2013 | Dekar | B25J 11/008 |
| | | | 434/127 |
| 2013/0321462 A1 | 12/2013 | Salter et al. | |
| 2014/0010441 A1* | 1/2014 | Shamaie | G06K 9/00355 |
| | | | 382/164 |
| 2014/0111667 A1* | 4/2014 | Hunt | H04N 5/23212 |
| | | | 348/231.99 |
| 2014/0160321 A1* | 6/2014 | Kim | H04N 5/23216 |
| | | | 348/239 |
| 2014/0225918 A1 | 8/2014 | Mittal et al. | |
| 2014/0247964 A1* | 9/2014 | Kurokawa | G06F 3/005 |
| | | | 382/103 |
| 2014/0306877 A1* | 10/2014 | Katz | G06F 3/017 |
| | | | 345/156 |
| 2014/0361988 A1* | 12/2014 | Katz | G06F 3/011 |
| | | | 345/156 |
| 2014/0368719 A1* | 12/2014 | Kaneko | H04N 5/23216 |
| | | | 348/333.02 |
| 2015/0016672 A1* | 1/2015 | Tsunoda | G06K 9/00 |
| | | | 382/103 |
| 2015/0063661 A1 | 3/2015 | Lee et al. | |
| 2015/0323999 A1* | 11/2015 | Izumi | G06K 9/00355 |
| | | | 345/156 |
| 2015/0338924 A1* | 11/2015 | Watanabe | G06F 3/017 |
| | | | 345/156 |

FOREIGN PATENT DOCUMENTS

| | | |
|---|---|---|
| JP | 2006-277666 | 10/2006 |
| KR | 10-2010-0047793 | 5/2010 |
| WO | WO 2013/028279 A1 | 2/2013 |
| WO | WO 2013/093906 A1 | 6/2013 |

OTHER PUBLICATIONS

Lo, et al.; "Augmediated Reality System Based on 3D Camera Selfgesture Sensing"; IEEE ISTAS; retrieved from www.eyetap.org; Jun. 27, 2013; 12 pages.

* cited by examiner

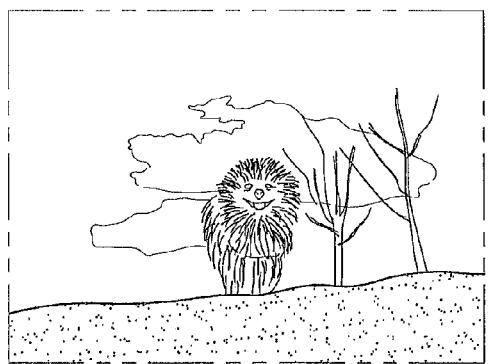
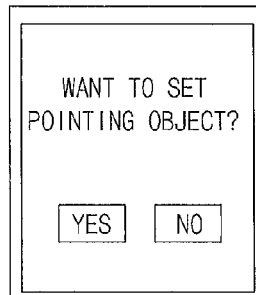
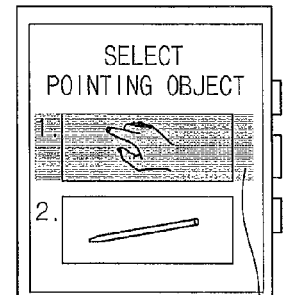
Fig.3A  Fig.3B  Fig.3C
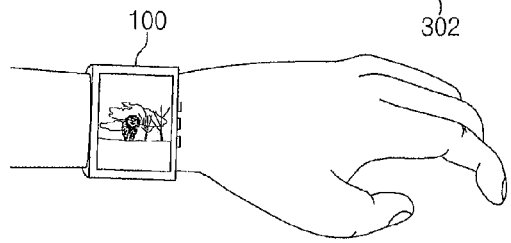
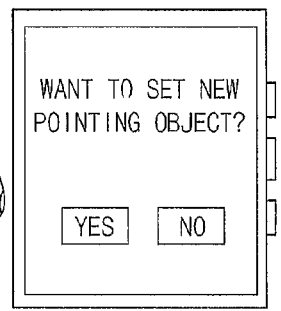
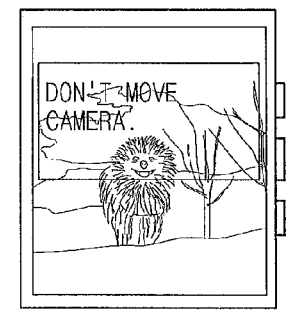
Fig.3D  Fig.3E
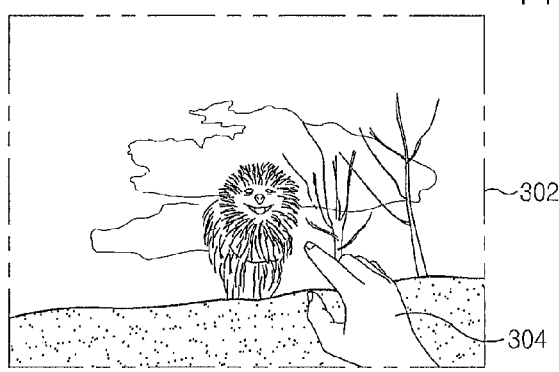
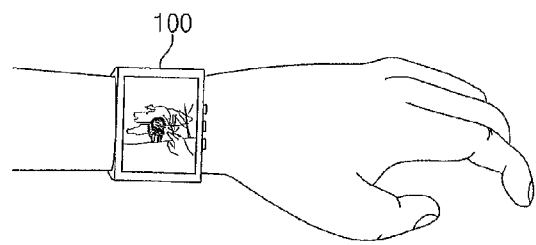
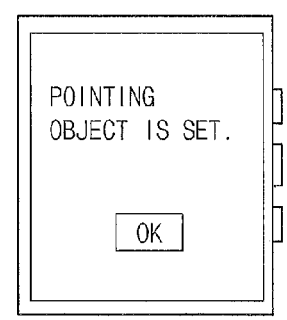
Fig.3F  Fig.3G

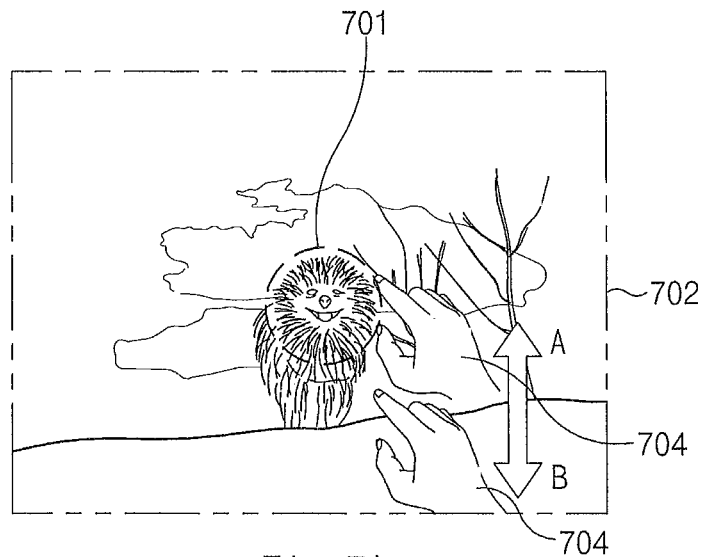
Fig.7A
 
Fig.7B  Fig.7C

ELECTRONIC DEVICE AND METHOD FOR IMAGE DATA PROCESSING

CROSS-REFERENCE TO RELATED APPLICATION(S) AND CLAIM OF PRIORITY

The present application is related to and claims priority under 35 U.S.C. §119 to an application filed in the Korean Intellectual Property Office on Mar. 24, 2014 and assigned Application No. 10-2014-0033797, the contents of which are incorporated herein by reference.

TECHNICAL FIELD

The present invention relates to an image data processing electronic device and method for controlling image data corresponding to an object selected by a pointing object according to the movement of the pointing object.

BACKGROUND

A user can directly manipulate an electronic device in order to perform functions such as zoom-in, zoom-out, and auto-focusing while obtaining image data by using the electronic device. Additionally, in order to insert a specific effect into the obtained image data, functions such as partial zoom-in or partial zoom-out can be performed by controlling the image data.

In the above typical electronic device, a user can undergo the inconvenience of having to directly manipulate the electronic device in order to perform functions such as zoom-in, zoom-out, and auto-focusing for a subject, which can be used while image data is being obtained.

Additionally, after the image data is obtained, the typical electronic device can provide and control a specific effect to meet the request of a user, but it can be difficult to obtain image data having an effect that the user wants.

SUMMARY

To address the above-discussed deficiencies, it can be a primary object to provide an electronic device and method for controlling preview image data according to the movement of a pointing object set in the preview image data obtained from a camera.

In a first example, an electronic device and method for obtaining final image data having an effect that a user wants by controlling preview image data according to the movement of a pointing object set in the preview image data obtained from a camera is disclosed herein.

In a second example, an electronic device for image data processing includes a camera module configured to obtain image data. The electronic device for image data processing also includes a control module configured to control image data on an object corresponding to a position of at least one pointing object among the image data obtained from the camera module according to a position and movement of the at least one pointing object.

In an third example, an image data processing method includes obtaining image data. The method also includes extracting an object corresponding to a position of at least one pointing object from the image data. The method further includes checking at least one of a position and movement of the at least one pointing object. The method includes controlling and outputting image data corresponding to the extracted object according to the checked result.

Before undertaking the DETAILED DESCRIPTION below, it can be advantageous to set forth definitions of certain words and phrases used throughout this patent document: the terms "include" and "comprise," as well as derivatives thereof, mean inclusion without limitation; the term "or," can be inclusive, meaning and/or; the phrases "associated with" and "associated therewith," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device can be implemented in hardware, firmware or software, or some combination of at least two of the same. It should be noted that the functionality associated with any particular controller can be centralized or distributed, whether locally or remotely. Definitions for certain words and phrases can be provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference can be now made to the following description taken in conjunction with the accompanying drawings, in which like reference numerals represent like parts:

FIGS. 3A through 3G are example screen views illustrating a method for setting a pointing object according to this disclosure.

FIGS. 7A through 7C are example screen views illustrating a method for zooming-in/zooming-out a specific object by controlling image data according to a movement occurring in an arbitrary space according to this disclosure.

DETAILED DESCRIPTION

Figure 1:
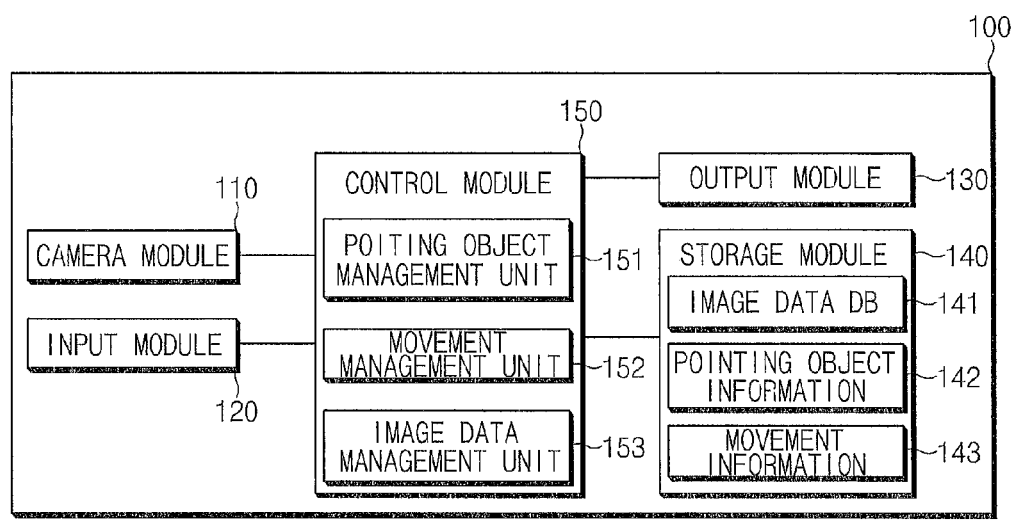
FIG. 1 is an example block diagram illustrating a main configuration of an image data processing electronic device according to this disclosure.

FIGS. 1 through 12, discussed below, and the various embodiments used to describe the principles of the present disclosure in this patent document can be by way of illustration only and should not be construed in any way to limit the scope of the disclosure. Those skilled in the art will understand that the principles of the present disclosure can be implemented in any suitably arranged electronic device. Hereinafter, embodiments will be described in more detail with reference to the accompanying drawings. Various embodiments are shown in the drawings and related details are described, but various modifications are possible and more embodiments may be introduced. Thus, it is intended that the disclosure covers the modifications and variations provided they come within the scope of the appended claims and their equivalents. With respect to the descriptions of the drawings, like reference numerals refer to like elements.

The term "include," "comprise," "including," or "comprising," specifies a property, a region, a fixed number, a step, a process, an element and/or a component but does not exclude other properties, regions, fixed numbers, steps, processes, elements and/or components. The meaning of "include," "comprise," "including," or "comprising," specifies a property, a region, a fixed number, a step, a process, an element and/or a component but does not exclude other properties, regions, fixed numbers, steps, processes, elements and/or components.

In this specification, the expression "or" includes any or all combinations of words listed. For example, "A or B" may include A or include B or include both A and B.

The terms 'first' and/or 'second' may be used to describe various elements; however, the elements should not be limited by these terms. For example, the above expressions do not limit the order and/or importance of corresponding components. The expressions are used to distinguish one component from another component. For example, a first user device and a second user device are all user devices and represent different user devices. For example, a first component may be referred to as a second component and vice versa without departing from the scope of the present invention.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Terms used in this specification can be used to describe specific embodiments, and are not intended to limit the scope of this disclosure. The terms of a singular form may include plural forms unless they have a clearly different meaning in the context.

Otherwise indicated herein, all the terms used herein, which include technical or scientific terms, can have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

An electronic device according to an embodiment of this disclosure can be a device having a camera function. For example, an electronic device can include at least one of smartphones, tablet personal computers (PCs), mobile phones, video phones, e-book readers, desktop PCs, laptop PCs, netbook computers, personal digital assistants (PDAs), portable multimedia players (PMPs), MP3 players, mobile medical equipment, cameras, or wearable devices (for example, head-mounted-devices (HMDs) such as electronic glasses, electronic clothing, electronic bracelets, electronic necklaces, appcessories, electronic tattoos, or smart-watches).

In an embodiment, electronic devices can be smart home appliances having a camera function. Smart home appliances, for example, an electronic device, can include at least one of digital video disk (DVD) players, audio systems, refrigerators, air conditioners, vacuum cleaners, ovens, microwaves, washing machines, air purifiers, set-top boxes, TV boxes (for example, the Samsung HomeSync™, Apple TV™, or Google TV™), game consoles, electronic dictionaries, electronic key, camcorders, or electronic frames.

An electronic device can include at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, car head units, industrial or household robots, financial institutions' automated teller machines (ATMs), and stores' point of sales (POS).

An electronic device can also include at least one of furniture or buildings/structures having a camera function, electronic boards, electronic signature receiving devices, projectors, or various measuring instruments (for example, water, electricity, gas, radio signal measuring instruments, and the like). An electronic device can be one of the above-mentioned various devices or a combination thereof. Additionally, an electronic can be a flexible device. Furthermore, it can be apparent to those skilled in the art that an electronic device may not be limited to the above-mentioned devices.

Hereinafter, embodiments disclosed herein will be described in more detail with reference to the accompanying drawings. The term "user" in various embodiments can refer to a person using an electronic device or a device using an electronic device (for example, an artificial intelligent electronic device).

FIG. 1 is an example block diagram illustrating a main configuration of an image data processing electronic device according to this disclosure.

Referring to FIG. 1, the image data processing electronic device 100 can include a camera module 110, an input module 120, an output module 130, a storage module 140, and a control module 150. The storage module 140 can include an image data DB 141, pointing object information 142, and movement information 143, and the control module 150 includes a pointing object management unit 151, a movement management unit 152, and an image data management unit 153.

The camera module 110 can obtain image data (hereinafter referred to as a preview image) and final image data for a specific space, for example, a specific space that the camera module 110 focuses, according to a control of the control module 150. The camera module 110 can obtain a preview image and can then provide it to the control module 150. The camera module 110 can store the preview image temporarily according to a control of the control module 150. The camera module 110 can generate final image data by capturing a preview image according to a control of the control module 150 and can then provide it to the control module 150. The camera module 110 can include at least one image sensor (for example, a front sensor or a rear sensor), a lens, an image signal processor (ISP), or a flash LED (for example, an LED or a xenon lamp).

The input module 120 can generate a signal for operating the electronic device 100 according to an input from the outside and can then provide it to the control module 150. The input module 120 can generate a recognition mode enter signal for recognizing the movement of at least one pointing object (hereinafter referred to as a pointing object) in a preview image according to an input from the outside. The input module 120 can generate a select signal for selecting a pre-stored pointing object. The input module 120 can generate a select signal for selecting an object identified from a preview image as a pointing object. The input module 120 can be formed with an input device such as a keypad, a keyboard, a touch pad, or a touch screen.

The output module 130 can display various screens operations according to a control of the control module 150. The output module 130 can be formed of a Liquid Crystal Display (LCD) or a touch screen, and if the output module 130 is formed of a touch screen, it can perform the role of the input module 120 simultaneously. The output module 130 can display a virtual button for entering a recognition mode for recognizing the movement of a pointing object in a preview image, a virtual button for selecting a pre-stored pointing object, and a virtual button for selecting an object identified from a preview image as a pointing object. The output module 130 can display various virtual buttons for controlling an operation of the electronic device 100 in addition to the above virtual buttons. The output module 130 can display the type of at least one pointing object stored in the storage module 140. The output module 130 can display a preview image obtained from the camera module 110 and a preview image completely controlled by the control module 150.

The storage module 140 can store a program or an application for operating the electronic device 100. The storage module 140 can store a preview image obtained from the camera module 110 and final image data including a controlled preview image in the image data DB 141. The storage module 140 can store information on at least one pointing object in the pointing object information 142. Image data of a pre-captured pointing object can be stored in the pointing object information 142. The storage module 140 can store a control instruction corresponding to at least one movement in the movement information 143.

The control module 150 can set a pointing object, control a preview image according to at least one change in the position and movement of the pointing object, and can then output the preview image to the output module 130. The control module 150 can control the preview image through a function including at least one of cropping, zoom-in, zoom-out, partial zoom-in, partial zoom-out, partial removal, out-focusing, composite, distortion, and augmented reality.

The pointing object management unit 151 of the control module 150 can obtain a preview image by activating the camera module 110 when an enter signal to a movement recognition mode can be received from the input module 120 or the output module 130. The movement recognition module can be a mode for recognizing the movement of an existing pointing object in a preview image. The pointing object management unit 151 can output the obtained preview image to the output module 130 and can store it in the storage module 140 temporarily. The pointing object management unit 151 can set a pointing object in a preview image when a setting signal for setting the pointing object is received from the input module 120.

In an embodiment, when an enter signal to a movement recognition mode is received, the control module 150 can check whether a pointing object is pre-stored in the storage module 140. When at least one pointing object is stored in the storage module 140, the pointing object management unit 151 can extract information on a pointing object and can then output it to the output module 130. The pointing object management unit 151 can receive a select signal for at least one piece of pointing object information among at least one outputted piece of pointing object information from the input module 120. A pointing object can be outputted as image data for an actual pointing object. The pointing object management unit 151 can set a pointing object according to a select signal.

In an embodiment, when an enter signal to a movement recognition mode is received, the control module 150 can check whether a pointing object is pre-stored in the storage module 140. When the pointing object is not pre-stored in the storage module 140, the pointing object management unit 151 can select a pointing object from a preview image.

If a movement does not occur for a critical time in the camera module 110, the pointing object management unit 151 can analyze at least one preview image obtained in real-time. The pointing object management unit 151 can compare a previous preview image with a current preview image. If there is no movement of an existing object in a preview image for a critical time, the pointing object management unit 151 can extract the boundary line of at least one existing object in the preview image. The boundary line of the extracted object can be outputted to the preview screen outputted to the output module 130. The pointing object management unit 151 can capture and output the preview screen having the boundary line displayed thereon. When a select signal for at least one object among the extracted objects is received from the input module 120 or the output module 130, the pointing object management unit 151 can set an object corresponding to the select signal as a pointing object.

If a movement does not occur for a critical time in the camera module 110, the pointing object management unit 151 can analyze at least one preview image obtained in real-time. The pointing object management unit 151 can compare a previous preview image with a current preview image. When an object that does not exist in a previous preview image is identified from a current preview image, the pointing object management unit 151 can automatically extract the identified object and can then set it as a pointing object.

The control module 150 can identify a change in at least one among the position and movement of the set pointing object from a preview image, and can then control the preview image to correspond to the identified change. The movement management unit 152 can set virtual x, y, and z-axis coordinate values for the current position of a pointing object. For example, the movement management unit 152 can set the x, y, and z-axis coordinate values of a pointing object on the basis of a plurality of pixels forming a preview image. The z-axis coordinate value can be arbitrarily set by the movement management unit 152. The movement management unit 152 can change the virtual x, y, and z-axis coordinate values by checking the moving distance in pixels when the pointing object moves to the left or right. The movement management unit 152 can change the virtual x, y, and z-axis coordinate values on the basis of the arbitrarily set z-axis coordinate value when the pointing object moves closer to or farther away from the camera module 110.

A control instruction corresponding to the movement identified by the movement management unit 152 can be an instruction for cropping. The movement management unit 152 can check that a pointing object selects a specific area to be cropped from a space corresponding to a preview image. The movement management unit 152 can check a coordinate value for at least one of the position and movement of a pointing object by checking a preview image. The movement management unit 153 can control the preview image so as to crop an area corresponding to the checked coordinate value. The image data management unit 153 can output only an image cropped from the preview image to the output module 130.

A control instruction corresponding to the movement identified by the movement management unit 152 can be an instruction for auto-focusing. The movement management unit 152 can select a reference position for auto-focusing from a space where a pointing object corresponds to a preview image. The movement management unit 152 can check a coordinate value for at least one of the position and movement of a pointing object by checking a preview image. The image data management unit 153 can control the preview image so as to perform auto-focusing on the basis of the position corresponding to the checked coordinate value. The image data management unit 153 can output the controlled preview image to the output module 130.

In an embodiment, a control instruction corresponding to the movement identified by the movement management unit 152 can be an instruction for zooming-in a specific area. The movement management unit 152 can select a reference position for zoom-in from a space where a pointing object corresponds to a preview image. The movement management unit 152 can check a coordinate value for at least one of the position and movement of a pointing object by checking a preview image. The image data management unit 153 can zoom-in image data in a predetermined area on the basis of the position corresponding to the checked coordinate value. The image data management unit 153 can control the preview image so as to add image data of a zoomed-in predetermined area to a preview image and display it. The image data management unit 153 can output the controlled preview image to the output module 130.

A control instruction corresponding to the movement identified by the movement management unit 152 can be an instruction for zooming-in a specific area to have depth. The movement management unit 152 can check that a pointing object selects a specific area to be zoomed-in from a space corresponding to a preview image and the pointing object moves in the direction of the camera module 110. The movement management unit 152 can check a coordinate value for at least one of the position and movement of a pointing object by checking a preview image. For example, the movement management unit 152 can check the coordinate value corresponding to a selected specific area and also can check a virtual z-axis coordinate value that is changed as the pointing object moves in the direction of the camera module 110. The image data management unit 153 can control a preview image so as to zoom-in a specific area corresponding to the checked coordinate value by providing the depth of the checked virtual z-axis coordinate value. Additionally, the control module 150 can control a preview image so as to zoom-out a specific area by providing the depth of the checked virtual z-axis coordinate value changed as a pointing object is farther away from the camera module 110. The image data management unit 153 can output the controlled preview image to the output module 130.

A control instruction corresponding to the movement identified by the movement management unit 152 can be an instruction for deleting a specific area. The movement management unit 152 can check that a pointing object covers a specific object in a space corresponding to a preview image. The movement management unit 152 can check the coordinate value for the position of a specific object covered by the pointing object in the preview image by checking at least one of the position and movement of the pointing object. The image data management unit 153 can control the preview image so as to remove the image data of an area corresponding to the checked coordinate value. The image data management unit 153 can correct the color of the area where the image data is removed to a color similar to a surrounding color. The image data management unit 153 can output the preview image where the image data is removed to the output module 130.

In an embodiment, a control instruction corresponding to the movement identified by the movement management unit 152 can be an instruction for calculating the total calories of food. For example, when a preview image includes image data relating to food and a pointing object set by the pointing object management unit 15 is chopsticks, the control module 150 can determine that a control instruction is a calorie calculation control instruction without checking a specific movement. The image data management unit 153 can check the calories of food identified by the pointing object. For this, the storage module 140 can further include a food calorie DB. The control module 150 can calculate the total calories that a user intakes by checking the calories of food identified by the pointing object. For this, the control module 150 can further include a calorie calculation unit. The image data management unit 153 can control the preview image so as to add the calculated total calories to the preview image. The image data management unit 153 can output the controlled preview image to the output module 130.

Figure 2:
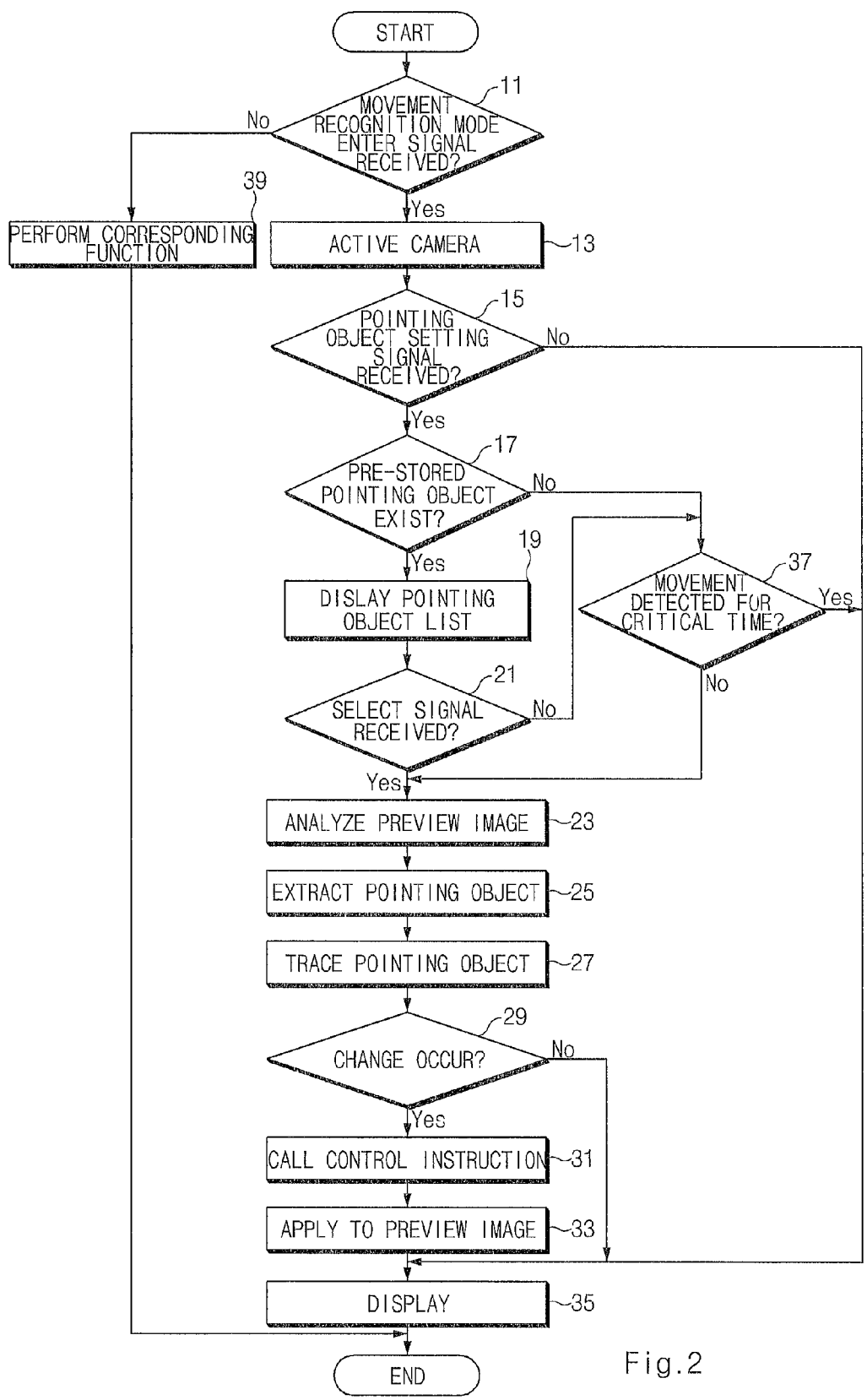
FIG. 2 is an example flowchart illustrating a method of controlling image data by using movement according to this disclosure.

FIG. 2 is an example flowchart illustrating a method for controlling image data by using movement according to this disclosure.

Referring to FIGS. 1 and 2, the control module can check whether a movement recognition mode enter signal for recognizing the movement of an existing pointing object in a preview image is received from the input module 120 in operation 11. When the enter signal is received in operation 11, the control module 150 can perform operation 13 and when the enter signal is not received in operation 11, the control module 150 can perform operation 39. The control module 150 can output an idle screen to the output module 130 or can perform a function being performed continuously in operation 39.

In operation 13, the control module 150 can activate the camera module 110 in operation 13. In operation 13, the control module 150 can output preview image data (hereinafter referred to as a preview image) obtained from the activated camera module 110 to the output module 130. The control module 150 can store a preview image in the storage module 140 temporarily. In operation 15, if a setting signal for setting a pointing object can be received from the input module 120, the control module 150 can perform operation 17 and if the setting signal for setting the pointing object can be not received from the input module 120, the control module 150 can perform operation 35. In operation 35, the control module 150 can output a preview image to the output module 130.

In operation 17, the control module 150 can check whether a pointing object is pre-stored in the storage module 140. On the basis of a check result, if the pointing object is pre-stored in the storage module 140, the control module 150 can perform operation 19. If the pointing object is not pre-stored in the storage module 140, the control module 150 can perform operation 37.

In operation 19, the control module 150 can extract the pointing object pre-stored in the storage module 140 and can then output a list of the extracted pointing object to the output module 130. The control module 150 can output the pointing object as image data on the pre-stored actual pointing object. If a select signal for selecting one pointing object from the displayed pointing object list is received in operation 21, the control module 150 can perform operation 23 and if the select signal is not received in operation 21, the control module 150 can perform operation 37.

In operation 23, the control module 150 can analyze a preview image. In operation 25, the control module 150 can extract a pointing object that is more similar than a critical value to the pointing object selected in operation 21, from the analyzed preview image. In operation 27, the control module 150 can trace the extracted pointing object. The control module 150 can trace the position and movement of the extracted pointing object by continuously comparing a previous preview image with a current preview image.

In operation 29, if a change in one of the position and movement of the pointing object occurs, the control module 150 can perform operation 31 and if the change in one of the position and movement of the pointing object does not occur, the control module 150 can perform operation 35. In operation 31, the control module 150 can call a control instruction according to an occurred change from the storage module 140. In operation 33, the control module 150 can perform operation 35 by applying the called control instruction to the preview image in operation 33. If the called control instruction is at least one of functions including the preview image's cropping, zoom-in, zoom-out, partial zoom-in, partial zoom-out, partial removal, out-focusing, composite, distortion, and augmented reality, the control module 150 can control the preview image by performing a function according to a control instruction.

In operation 35, the control module 150 can output a preview image completely controlled in operation 33 to the output module 130. When a final image data capture signal is received from the input module 120, the control module 150 can capture a preview image outputted to the output module 130 as final image data and then can store it in the storage module 140.

If the pointing object is not pre-stored in operation 17 or if the signal for the pointing object is not received for the critical time in operation 21, the control module 150 can detect the movement of the camera module 110 for the critical time in operation 37. If the movement of the camera module 110 is not detected for the critical time in operation 37, the control module 150 can perform operation 23. If the movement of the camera module 110 is not detected for the critical time in operation 37, the control module 150 can perform operation 35.

In an embodiment, the control module can analyze a preview image in operation 23, extract a pointing object from the preview image in operation 25, and perform operation 271. In operation 25, the control module 150 can analyze at least one preview image obtained for the critical time. If at least one subject in at least one preview image is identical, the control module 150 can extract the boundary line of the subject. The control module 150 can output the extracted boundary line to the output module 130 and when the boundary line of at least one object is selected from the boundary lines by the input module 120, can set a subject corresponding to the selected boundary line as a pointing object.

The control module can analyze a preview image in operation 23, extract a pointing object from the preview image in operation 25, and perform operation 271. In operation 25, the control module 150 can analyze at least one preview image obtained for the critical time. The control module 150 can automatically extract a subject identified from a preview image as a pointing object and can then set it from a specific time point by comparing a previous preview image with a current preview image.

The control module 150 can trace the above set pointing object in operation 27 and can then perform operation 29. Descriptions for operations after operation 27 can be made above and thus omitted.

FIGS. 3A-3G are example screen views illustrating a method for setting a pointing object according to this disclosure.

Referring to FIG. 1 and FIGS. 3A-3G, if the camera module 110 of the image data processing electronic device 100 (hereinafter referred to as the electronic device 100) is activated, as shown in FIG. 3A, a preview image for a specific space 302 can be outputted to the output module 130 of the electronic device 100. As shown in FIG. 3A, if the camera module 110 is activated and a movement recognition mode entry signal is received through the input module 120 or the output module 130, a message can be outputted to the output module 130 as shown in FIG. 3B. If "NO" is selected from FIG. 3B, the electronic device 100 can continuously output the screen shown in FIG. 3A.

If "YES" is selected from FIG. 3B and a pointing object is pre-stored in the storage module 140, the electronic device 100 can display a screen as shown in FIG. 3B and if the pointing object is not pre-stored, the electronic device can display a screen as shown in FIG. 3D. If the pointing object is pre-stored in the storage module 140, the electronic device 100 can display the image data of the pre-stored pointing object as shown in FIG. 3C. If an area 311 is selected as shown in FIG. 3C, the pointing object can be set to a finger as shown in FIG. 3f.

In an embodiment, if "NO" is selected from FIG. 3D, the electronic device 100 can continuously output the screen as shown in FIG. 3A and if "YES" is selected, the electronic device 100 can display a message on a screen as shown in FIG. 3E. If a screen shown in FIG. 3F is continuously outputted as a preview image for a critical time, the control module 150 can display the boundary line of an object identified from the preview image. The electronic device 100 can output the preview image having the boundary line thereon in a still state for a critical time until an object is selected by a user. If a finger is selected as a pointing object from the preview image displayed in a still state as shown in FIG. 3F, the electronic device 100 can display a screen as shown in FIG. 3G.

If "NO" is selected from FIG. 3D, the electronic device 100 can continuously output the screen as shown in FIG. 3A and if "YES" is selected, the electronic device 100 can display the screen as shown in FIG. 3E. The electronic device 100 can check a change in an object in a preview image by analyzing the preview image obtained for a critical time. For example, the electronic device 100 can compare a previous preview image obtained from FIG. 3A with a current preview image obtained from FIG. 3F. According to a comparison result, the finger of FIG. 3F can be newly identified from the current preview image and the electronic device 100 can extract the finger as a pointing object 304. The control module 150 can output a screen as shown in FIG. 3G when the pointing object 304 is extracted.

Figure 4:
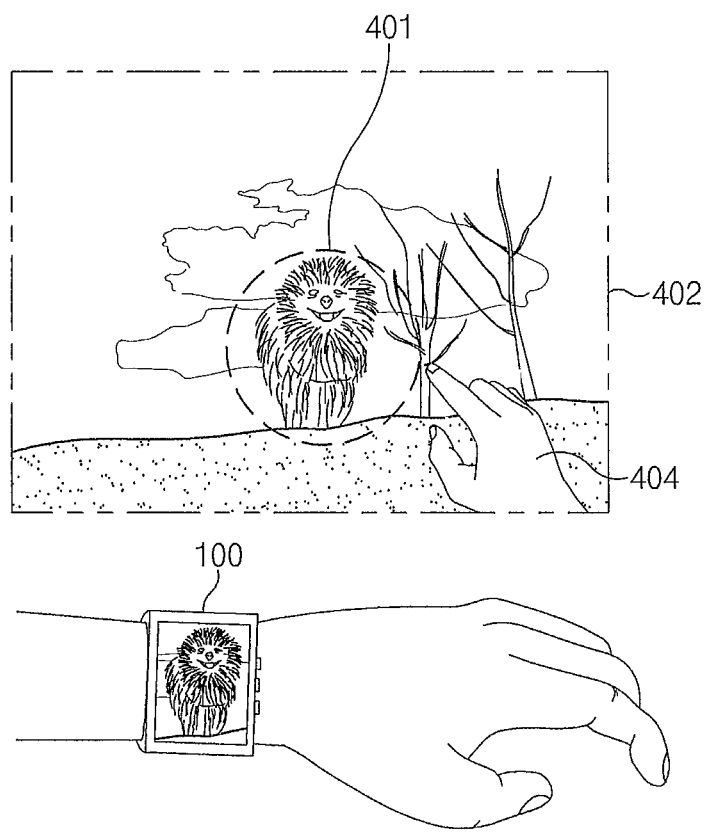
FIG. 4 is an example screen view illustrating a method for extracting only a specific object by controlling image data according to a movement occurring in an arbitrary space according to this disclosure.

FIG. 4 is an example screen view illustrating a method for extracting only a specific object by controlling image data according to a movement occurring in an arbitrary space according to this disclosure.

Referring to FIGS. 1 and 4, when a user draws a circle 410 in a specific space 402 by using a finger set as a pointing object 404 as shown in FIG. 4, the image data processing electronic device 100 (hereinafter referred to as the electronic device 100) can extract an area 401 and can then display it on the output module 130 of the electronic device 100. For example, if a movement for drawing a circle by using the pointing object 404 in the specific space 402 occurs, a control instruction for cropping an area corresponding to the circuit can be set in advance. If the movement of the pointing object 404 drawing a circle in a space corresponding to a preview image displayed on the output module 130 is detected, the electronic device 100 can extract an area corresponding to the circle and can then display it on the output module 130 of the electronic device 100 as shown in FIG. 4. If a signal for obtaining a preview image for an area displayed on the output module 130 is inputted from a user, the electronic device 100 can store the preview image displayed on the output module 130 as final image data.

Figure 5:
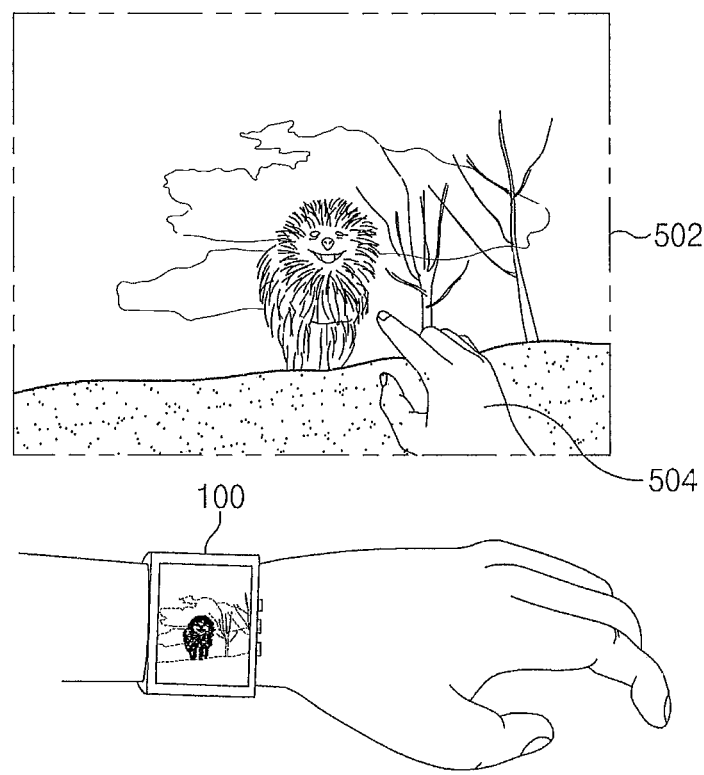
FIG. 5 is an example screen view illustrating a method for auto-focusing an image by controlling image data according to a movement occurring in an arbitrary space according to this disclosure.

FIG. 5 is an example screen view illustrating a method for auto-focusing an image by controlling image data according to a movement occurring in an arbitrary space according to this disclosure.

Referring to FIGS. 1 and 5, when a user taps an arbitrary position in a specific space 502 by using a finger set as a pointing object 504 as shown in FIG. 5, the image data processing electronic device 100 (hereinafter referred to as the electronic device 100) can apply an auto-focusing effect to a preview image by controlling the preview image displayed on the output module 130 on the basis of the tapped position. If a signal for obtaining a preview image controlled with an output focusing effect displayed on the output module 130 is inputted from a user, the electronic device 100 can store the preview image displayed on the output module 130 as final image data.

Figure 6:
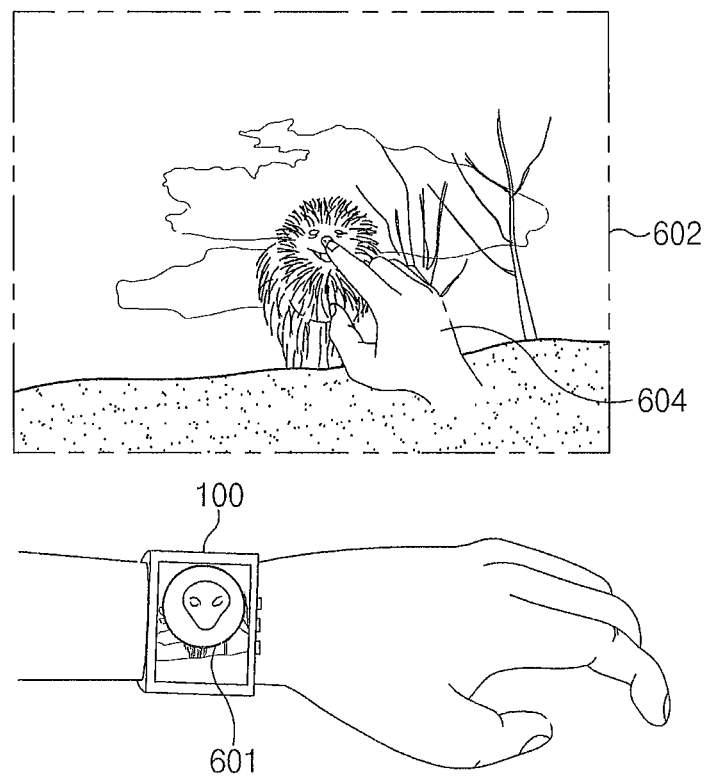
FIG. 6 is an example screen view illustrating a method for zooming-in a specific object by controlling image data according to a movement occurring in an arbitrary space according to this disclosure.

FIG. 6 is an example screen view illustrating a method for zooming-in a specific object by controlling image data according to a movement occurring in an arbitrary space according to this disclosure.

Referring to FIGS. 1 and 6, when a user fixes a finger set as a pointing object 604 at an arbitrary position in a specific space 602 as shown in FIG. 6, the image data processing electronic device 100 (hereinafter referred to as the electronic device 100) can zoom-in an object corresponding to the position as shown in an area 601. The electronic device 100 can control a preview image by adding a zoomed-in object to the preview image. If a signal for obtaining a preview image having zoomed-in image data displayed on the output module 130 is inputted from a user, the electronic device 100 can store the preview image displayed on the output module 130 as final image data.

FIGS. 7A through 7C are example screen views illustrating a method for zooming-in/zooming-out a specific object by controlling image data according to a movement occurring in an arbitrary space according to this disclosure.

Referring to FIG. 1 and FIGS. 7A through 7C, as shown in FIG. 7A, a user can select an arbitrary area 701 in a specific space 702 by using a finger set as a pointing object 704 and then can move the finger in an A to B direction. The image data processing electronic device 100 (hereinafter referred to as the electronic device 100) can calculate a virtual z-axis coordinate value changed when the finger moves in the A to B direction. The electronic device 100 can set a virtual coordinate value for the position A that the pointing object 704 indicates. The electronic device 100 can check a virtual coordinate value for B with respect to A when the pointing object 704 moves in the A to B direction. The electronic device 100 can calculate a difference between coordinate values changed from A to B.

As shown in FIG. 7B, the electronic device 100 can control a preview image to zoom-in image data corresponding to a selected arbitrary area 701 by the depth corresponding to the difference between the coordinate values changed from A to B, and can then output the controlled preview image to the output module 130.

On the other hand, as shown in FIG. 7A, a user can select an arbitrary area 701 in the specific space BG by using a finger set as a pointing object 704 and then can move the finger in a B to A direction. The electronic device 100 can calculate a virtual z-axis coordinate value changed when the finger moves in the B to A direction. The electronic device 100 can set a virtual coordinate value for the position B that the pointing object 704 indicates. The electronic device 100 can check a virtual coordinate value for A with respect to B when the pointing object PO moves in the B to A direction. The electronic device 100 can calculate a difference between A and B coordinate values.

As shown in FIG. 7C, the electronic device 100 can control a preview image to zoom-out image data corresponding to the selected arbitrary area 701 by the depth corresponding to the difference between the coordinate values changed from B to A, and can then output the controlled preview image to the output module 130.

Figure 8:
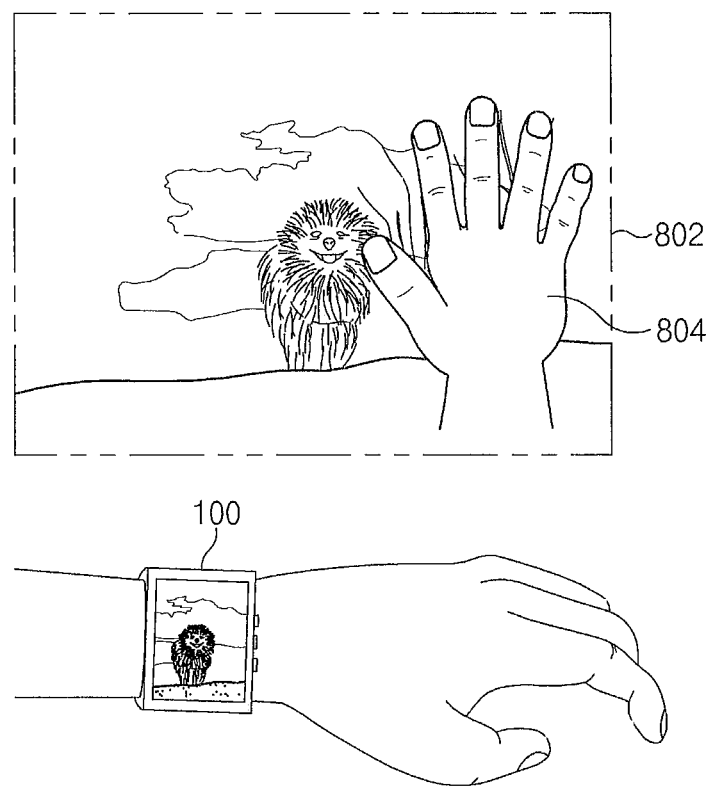
FIG. 8 is an example screen view illustrating a method for removing a specific object by controlling image data according to a movement occurring in an arbitrary space according to this disclosure.

FIG. 8 is an example screen view illustrating a method for removing a specific object by controlling image data according to a movement occurring in an arbitrary space according to this disclosure.

Referring to FIGS. 1 and 8, when a user covers an arbitrary area in a specific space 802 for more than a critical time by using a set pointing object 804 as shown in FIG. 8, the image data processing electronic device 100 (hereinafter referred to as the electronic device 100) can control a preview image to remove an object corresponding to the covered position and can then display it. If a signal for obtaining a preview image where an object displayed on the output module 130 is removed is inputted from a user, the electronic device 100 can store the preview image displayed on the output module 130 as final image data. The electronic device 100 can fill pixels corresponding to the deleted object with a color similar to that of surrounding pixels and can then output it as a preview image.

Figure 9:
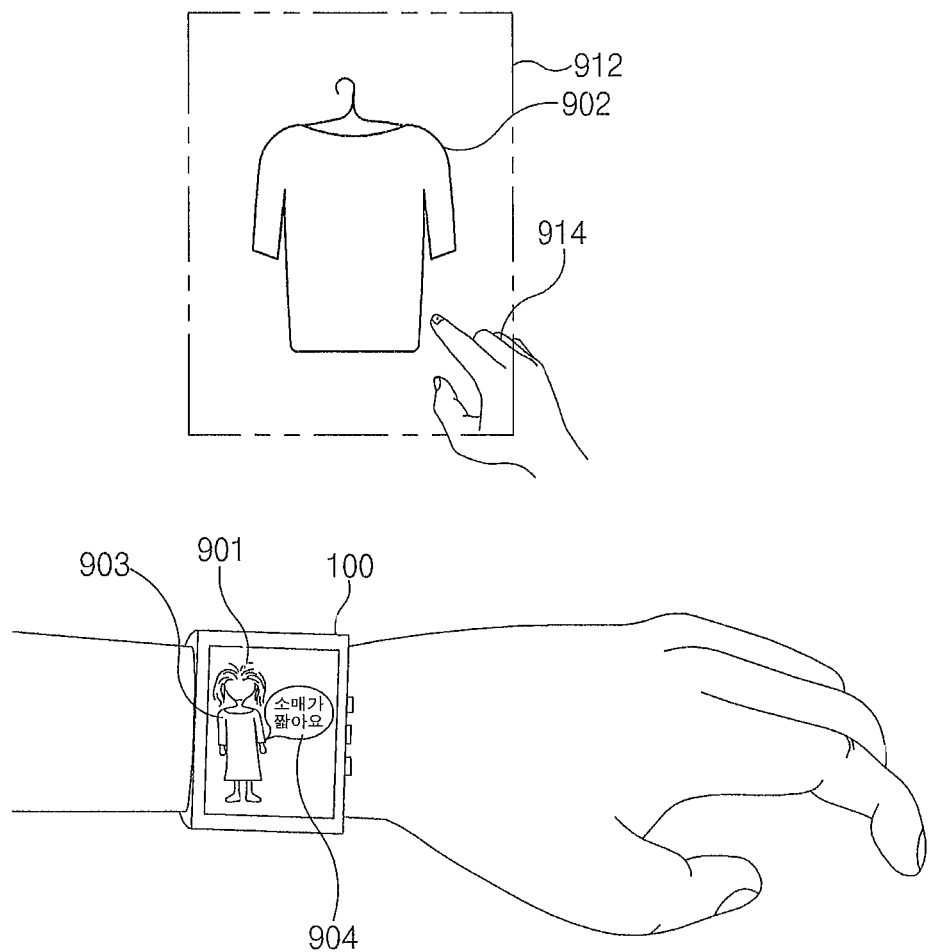
FIG. 9 is an example screen view illustrating a method for controlling image data pre-stored as image data for clothes in an arbitrary space according to this disclosure.

FIG. 9 is an example screen view illustrating a method for controlling image data pre-stored as image data for clothes in an arbitrary space according to this disclosure.

Referring to FIGS. 1 and 9, as shown in FIG. 9, a user can call first image data 901 for the whole body of a user or another person and can then output it on the output module 130 of the image data processing electronic device 100

(hereinafter referred to as the electronic device 100). The first image data 901, as image data obtained from the camera module 120 configured with a plurality of stereo cameras, can be 3D image data and can check the numerical values of the whole body. When a signal for driving the camera module 120 is inputted from a user, the electronic device 100 can drive a plurality of stereo cameras.

When a pointing object 914 selects an arbitrary object 902 from a specific space 912, the electronic device 100 can obtain second image data 903 for the object 902. The electronic device 100 can check the actual dimensions of the object 902 from the second image data 903 of the object 902 obtained from the camera module 120 including a stereo camera. The second image data 903, as image data obtained from the camera module 120 configured with a plurality of stereo cameras, can be 3D image data. The electronic device 100 can synthesize the first image data 901 outputted on the output module 130 with the second image data 903. The electronic device 100 can synthesize the first image data 901 and the second image data 903 and can then display a message 904 according to a synthesis result.

The electronic device 100 can check the numerical values of the whole body according to the first image data 901 and can check the actual dimensions of clothes according to the second image data 903, so that the first image data 902 is synthesized with the second image data 903. A user can check final image data having an effect as if the clothes was put on the body, and thus can check which part of the body does not fit the clothes or whether the clothes match the body. Especially, when the arm's length of the clothes does not match that of the body, the electronic device 100 can display a message 904 for notifying that the sleeve length is short. Due to this, a user can determine the purchase of the clothes without directly wearing the clothes. The electronic device 100 can transmit the checked actual dimensions and final image data of the clothes to an external device through communication.

Figure 10:
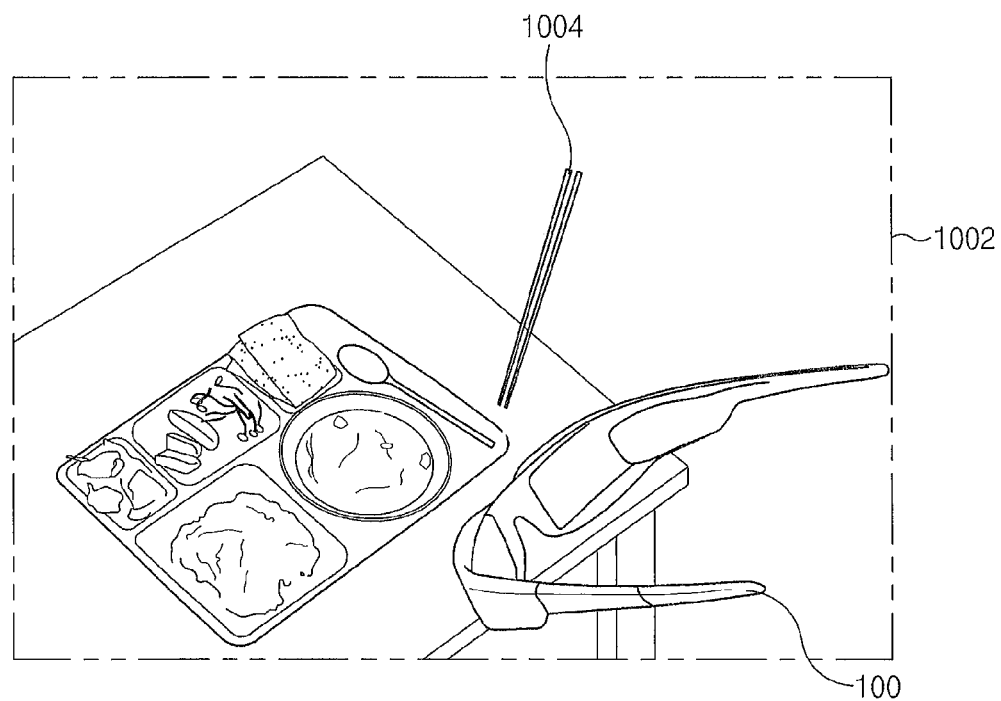
FIG. 10 is an example screen view illustrating a method for displaying food calories included in image data by controlling the image data according to this disclosure.

FIG. 10 is an example screen view illustrating a method for displaying food calories included in image data by controlling the image data according to this disclosure.

Referring to FIGS. 1 and 10, when a user sets chopsticks as a pointing object 1004 as shown in FIG. 10, a preview image 1002 on food obtained from the camera module 120 of the image data processing electronic device 100 (hereinafter referred to as the electronic device 100) can be outputted. The electronic device 100 can obtain a preview image from the camera module 120 including one camera or an array camera. The electronic device 100 can include an array camera as the camera module 120 so as to check the position of the pointing object 1004 more accurately. The array camera can be mounted at any place where a camera is able to be mounted in the electronic device 100.

The electronic device 100 can check the type of food by analyzing the outputted preview image 1002. The electronic device 100 can check the type and amount of food when the pointing object 1004 is placed on the food. The electronic device 100 can calculate the total calories that a user intakes according to the checked type and amount of food by using a pre-stored food calorie table. The calculated total calories can be added to a preview image and can then be displayed. If a signal for obtaining a preview image having the total calories that a user intakes displayed on the output module 130 is inputted from a user, the electronic device 100 can store the preview image displayed on the output module 130 as final image data.

Figure 11:
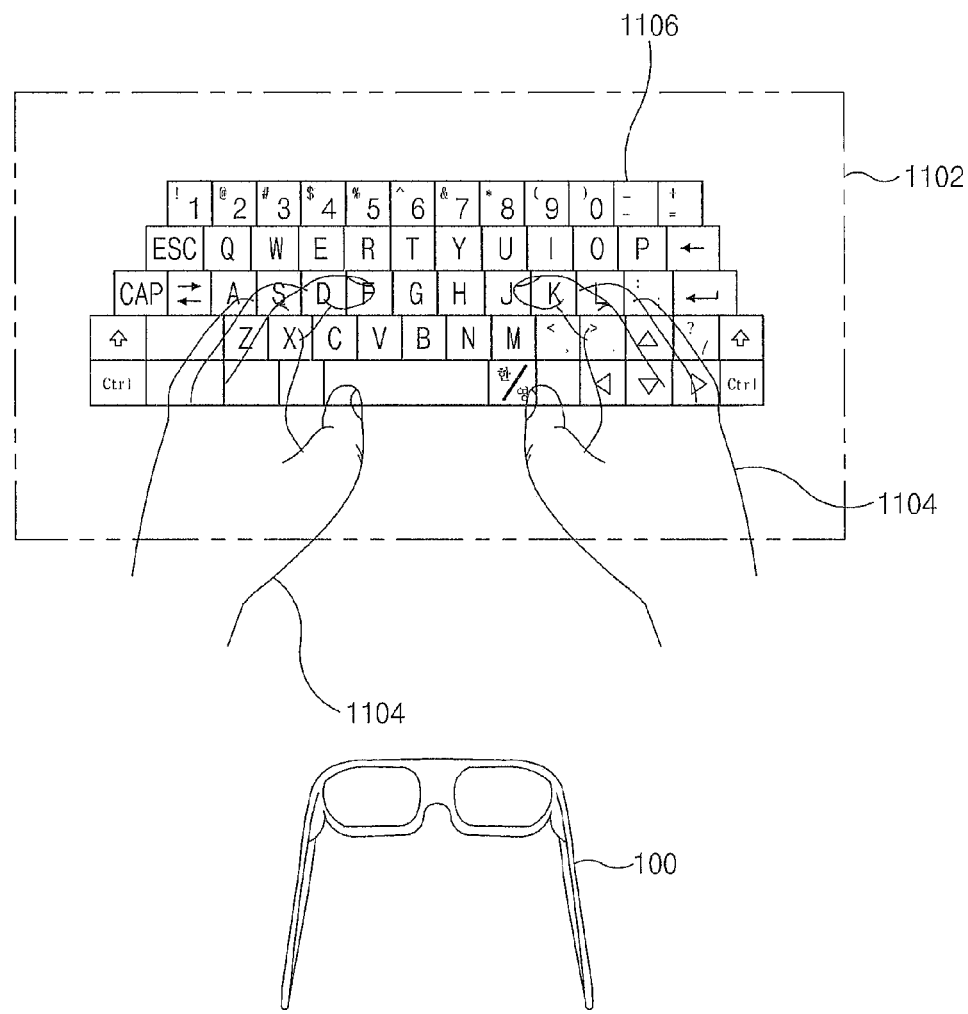
FIG. 11 is an example screen view illustrating a method for controlling image data by using a plurality of pointing objects according to this disclosure.

FIG. 11 is a screen view illustrating a method for controlling image data by using a plurality of pointing objects according to an embodiment of the present invention.

Referring to FIGS. 1 and 11, when a user sets the five fingers of the right hand and the five fingers of the left hand as a pointing object 1104 as shown in FIG. 11, image data for the movement of a finger can be obtained from the camera module 120 of the image data processing electronic device 100 (hereinafter referred to as the electronic device 100). The electronic device 100 can output a virtual keyboard 1106 on a space 1102 obtained from the camera module 120 as shown in FIG. 11. For this, the electronic device 100 can include a beam projector. The electronic device 100 can obtain a preview image from the camera module 120 including one camera or an array camera. The electronic device 100 can include an array camera as the camera module 120 so as to check the position of the pointing object 1104 more accurately. The array camera can be mounted at any place where a camera is able to be mounted in the electronic device 100.

The electronic device 100 can check the movement of a pointing object by analyzing a preview image obtained from the camera module 120 in real time. The electronic device 100 can check a keyboard where an input occurs by the movement of a pointing object and can then display a character corresponding to an inputted key or perform a function corresponding to an inputted key. The electronic device 100 can display a character or a function as image data on the output module 130 of the electronic device 100 and can then transmit it to another electronic device connected to the electronic device 100 through communication. If a signal for obtaining image data for a character displayed on the output module 130 or a performed function is inputted from a user, the electronic device 100 can store the image data displayed on the output module 130 as final image data. If a signal for obtaining image data for a character transmitted to another electronic device or a performed function is inputted from a user, the electronic device 100 can store the image data transmitted to another electronic device as final image data.

Figure 12:
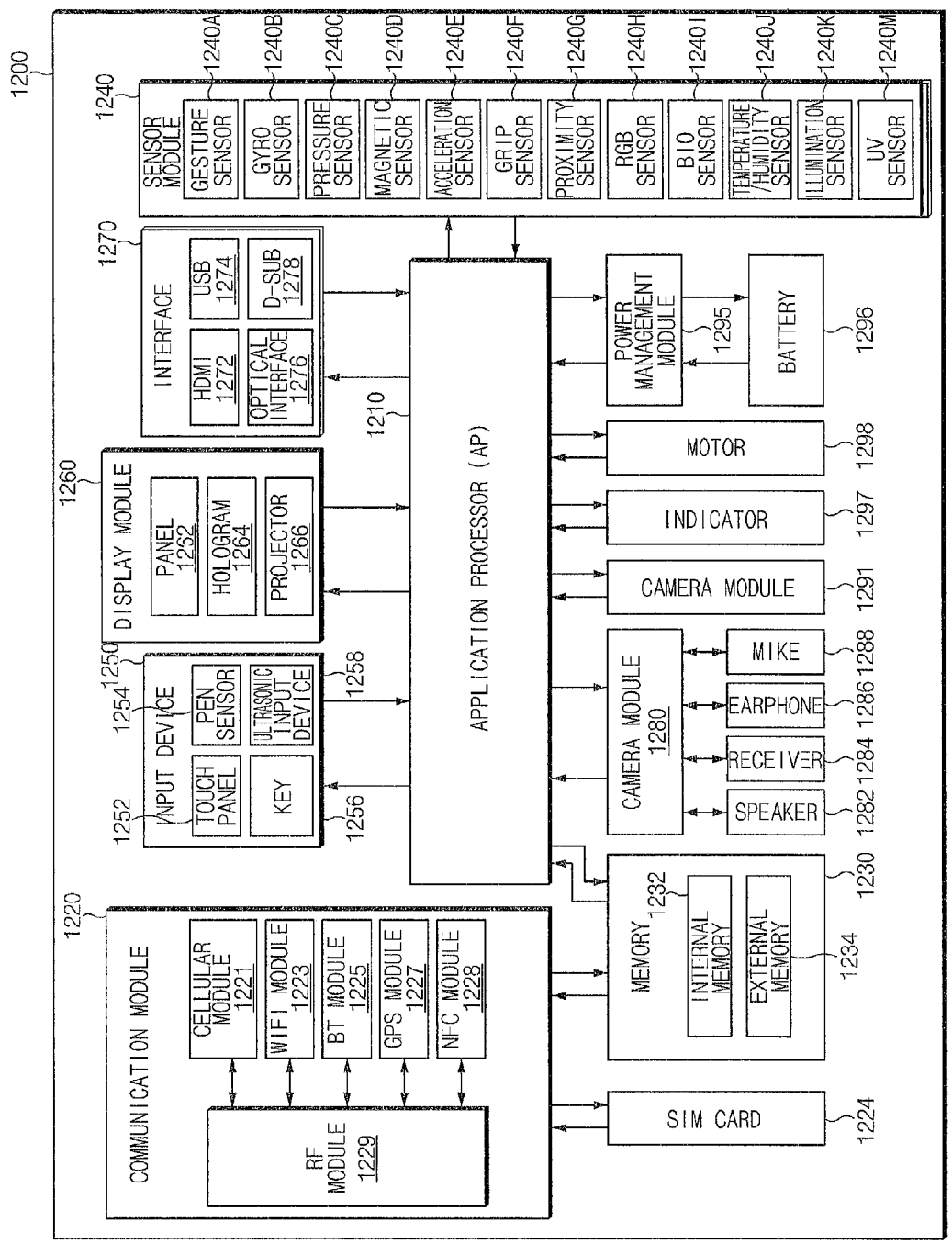
FIG. 12 is an example block diagram illustrating an electronic device according to this disclosure.

FIG. 12 is an example block diagram illustrating an electronic device according to this disclosure.

Referring to FIG. 12, the electronic device 1200 can configure all or part of the image data processing electronic device 100 shown in FIG. 1. The electronic device 1200 can include at least one application processor (AP) 1210, a communication module 1220, a subscriber identification module (SIM) card 1224, a memory 1230, a sensor module 1240, an input device 1250, a display 1260, an interface 1270, an audio module 1280, a camera module 1291, a power management module 1295, a battery 1296, an indicator 1297, and a motor 1298.

The AP 1210 can control a plurality of hardware or software components connected to the AP 1210 and also can perform various data processing and operations with multimedia data by executing an operating system or an application program. The AP 1210 can be implemented with a system on chip (SoC), for example. In an embodiment, the AP 1210 can further include a graphic processing unit (GPU). The AP 1210 (for example, the control module 150) can set at least one pointing object and also can control a preview image according to at least one change in the position and movement of the pointing object to output it on the display 1260. The AP 1210 can control the preview image through a function including at least one of cropping, zoom-in, zoom-out, partial zoom-in, partial zoom-out, partial removal, out-focusing, composite, distortion, and augmented reality. At this point, the preview image can be preview image data for a specific space that the camera module 1291 focuses.

The communication module 1220 can perform data transmission through communication between other electronic devices connected to the electronic device 1200 (for example, the electronic device 100) via a network. The communication module 1220 can include a cellular module 1221, a Wifi module 1223, a BT module 1225, a GPS module 1227, an NFC module 1228, and a radio frequency (RF) module 1229.

The cellular module 1221 can provide voice calls, video calls, text services, or internet services through a communication network (for example, LTE, LTE-A, CDMA, WCDMA, UMTS, WiBro, or GSM). Additionally, the cellular module 1221 can distinguish and authenticate an electronic device in a communication network by using a subscriber identification module (for example, the SIM card 1224), for example. The cellular module 1221 can perform at least part of a function that the AP 1210 provides. For example, the cellular module 1221 can perform at least part of a multimedia control function.

In an embodiment, the cellular module 1221 can further include a communication processor (CP). Additionally, the cellular module 1221 can be implemented with SoC, for example. As shown in FIG. 12, components such as the cellular module 1221 (for example, a CP), the memory 1230, or the power management module 295 can be separated from the AP 1210, but the AP 1210 can be implemented including some of the above-mentioned components (for example, the cellular module 1221).

The AP 1210 or the cellular module 1221 (for example, a CP) can load instructions or data, which can be received from a nonvolatile memory or at least one of other components connected thereto, into a volatile memory and then can process them. Furthermore, the AP 1210 or the cellular module 1221 can store data received from or generated by at least one of other components in a nonvolatile memory.

Each of the Wifi module 1223, the BT module 1225, the GPS module 1227, and the NFC module 1228 can include a processor for processing data transmitted/received through a corresponding module. Although the cellular module 1221, the Wifi module 1223, the BT module 1225, the GPS module 1227, and the NFC module 1228 can be shown as separate blocks in FIG. 12, some (for example, at least two) of the cellular module 1221, the Wifi module 1223, the BT module 1225, the GPS module 1227, and the NFC module 1228 can be included in one integrated chip (IC) or an IC package. For example, at least some (for example, a CP corresponding to the cellular module 1221 and a Wifi processor corresponding to the Wifi module 1223) of the cellular module 1225, the Wifi module 1227, the BT module 1228, the GPS module 1221, and the NFC module 1223 can be implemented with one SoC.

The RF module 1229 can be responsible for data transmission, for example, the transmission of an RF signal. Although not shown in the drawings, the RF module 1229 can include a transceiver, a power amp module (PAM), a frequency filter, or a low noise amplifier (LNA). Additionally, the RF module 1229 can further include components for transmitting/receiving electromagnetic waves on a free space in a wireless communication, for example, conductors or conducting wires. Although the cellular module 1221, the Wifi module 1223, the BT module 1225, the GPS module 1227, and the NFC module 1228 share one RF module 1229 shown in FIG. 12, at least one of the cellular module 1221, the Wifi module 1223, the BT module 1225, the GPS module 1227, and the NFC module 1228 can perform the transmission of an RF signal through an additional RF module.

The SIM card 1224 can be a card including a subscriber identification module and can be inserted into a slot formed at a specific position of an electronic device. The SIM card 1224 can include unique identification information (for example, an integrated circuit card identifier (ICCID)) or subscriber information (for example, an international mobile subscriber identity (IMSI)). The SIM card 1224 can store a preview image obtained from the camera module 1291 and final image data including a captured controlled preview image. The SIM card 1224 can store information on at least one pointing object. The SIM card 1224 can store image data of a pre-captured pointing object. The SIM card 1224 can store a control instruction corresponding to at least one movement.

The memory 1230 (for example, the storage module 140) can include an internal memory 1232 or an external memory 1234. The internal memory 1232 can include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory). The memory 1230 can store a preview image obtained from the camera module 1291 and final image data including a captured controlled preview image. The memory 1230 can store information on at least one pointing object. The memory 1230 can store image data of a pre-captured pointing object. The memory 1230 can store a control instruction corresponding to at least one movement.

In an embodiment, the internal memory 1232 can be a Solid State Drive (SSD). The external memory 1234 can further include flash drive, for example, compact flash (CF), secure digital (SD), micro secure digital (Micro-SD), mini secure digital (Mini-SD), extreme digital (xD), or memory-stick. The external memory 1234 can be functionally connected to the electronic device 1200 through various interfaces. According to an embodiment of the present invention, the electronic device 1200 can further include a storage device (or a storage medium) such as a hard drive.

The sensor module 1240 can measure physical quantities or detect an operating state of the electronic device 1200, thereby converting the measured or detected information into electrical signals. The sensor module 1240 can include at least one of a gesture sensor 1240A, a gyro sensor 1240B, a pressure sensor 1240C, a magnetic sensor 1240D, an acceleration sensor 1240E, a grip sensor 1240F, a proximity sensor 1240G, a color sensor 1240H (for example, a red, green, blue (RGB) sensor), a bio sensor 1240I, a temperature/humidity sensor 1240J, an illumination sensor 1240K, and a ultra violet (UV) sensor 1240M. Additionally/alternately, the sensor module 1240 can include an E-nose sensor, an electromyography (EMG) sensor, an electroencephalogram (EEG) sensor, an electrocardiogram (ECG) sensor, an infra red (IR) sensor, an iris sensor, or a fingerprint sensor. The sensor module 1240 can further include a control circuit for controlling at least one sensor therein.

The user input unit 1250 can include a touch panel 1252, a (digital) pen sensor 1254, a key 1256, or an ultrasonic input device 1258. The touch panel 1252 (for example, the output module 130) can recognize a touch input through at least one of capacitive, resistive, infrared, or ultrasonic methods, for example. Additionally, the touch panel 1252 can further include a control circuit. In the case of the capacitive method, both direct touch and proximity recognition are possible. The touch panel 1252 can further include a tactile layer. In this case, the touch panel 1252 can provide a tactile response to a user. The input device 1250 can generate a signal for operating the electronic device 100 according to an input from the outside and can then provide it to the AP 1210. The input device 1250 can generate a recognition mode enter signal for recognizing the movement of at least one pointing object in a preview image according to an input from the outside. The input device 1250 can generate a select signal for selecting a pre-stored pointing object. The input device 1250 can generate a select signal for selecting an object identified from a preview image as a pointing object.

The (digital) pen sensor 1254 can be implemented through a method similar or identical to that of receiving a user's touch input or an additional sheet for recognition. The key 1256 (for example, the input module 120) can include a physical button, an optical key, or a keypad. The ultrasonic input device 1258, as a device checking data by detecting sound waves through a mike in the electronic device 1200, can provide wireless recognition through an input tool generating ultrasonic signals. In an embodiment, the electronic device 1200 can receive a user input from an external device (for example, a computer or a server) connected to the electronic device 200 through the communication module 1220.

The display module 1260 can include a panel 1262, a hologram 1264, or a projector 1266. The panel 1262 can include a liquid-crystal display (LCD) or an active-matrix organic light-emitting diode (AM-OLED), for example. The panel 1262 can be implemented to be flexible, transparent, or wearable, for example. The panel 1262 and the touch panel 1252 can be configured with one module. The hologram 1264 can show three-dimensional images in the air by using the interference of light. The projector 1266 can display an image by projecting light on a screen. The screen, for example, can be placed inside or outside the electronic device 1200. The display 1260 can further include a control circuit for controlling the panel 1262, the hologram 1264, or the projector 1266. The display module 1260 can display various screens operations according to a control of the AP 1210. The display module 1260 can display the type of at least one pointing object stored in the memory 1230. The display module 1260 can display a preview image obtained from the camera module 1291 and also can display a preview image completely controlled by the AP 1210.

The interface 1270 can include a high-definition multimedia interface (HDMI) 1272, a universal serial bus (USB) 1274, an optical interface 1276, or a D-subminiature (sub) 1278. Additionally/alternately, the interface 1270 can include a mobile high-definition link (MHL) interface, a secure Digital (SD) card/multi-media card (MMC) interface, or an infrared data association (IrDA) standard interface.

The audio module 1280 can convert sound and electrical signals in both directions. The audio module 1280 can provide sound information inputted/outputted through a speaker 1282, a receiver 1284, an earphone 1286, or a mike 1288.

The camera module 1291 (for example, the camera module 110), as a device for capturing a still image and a video, can include at least one image sensor (for example, a front sensor or a rear sensor), a lens, an image signal processor (ISP), or a flash LED (for example, an LED or a xenon lamp). The camera module 1291 can obtain a preview image and final image data for a specific space according to a control of the AP 1210. The camera module 1291 can obtain a preview image and can then provide it to the AP 1210. The camera module 1291 can store the preview image temporarily according to a control of the AP 1210. The camera module 1291 can generate final image data by capturing a preview image according to a control of the AP 1210 and can then provide it to the AP 1210.

The power management module 1295 can manage the power of the electronic device 1200. Although not shown in the drawings, the power management module 1295 can include a power management integrated circuit (PMIC), a charger integrated circuit (IC), or a battery or fuel gauge, for example.

The PMIC can be built in an IC or SoC semiconductor, for example. A charging method can be classified as a wired method and a wireless method. The charger IC can charge a battery and can prevent overvoltage or overcurrent flow from a charger. The charger IC can include a charger IC for at least one of a wired charging method and a wireless charging method. As the wireless charging method, for example, there can be a magnetic resonance method, a magnetic induction method, or an electromagnetic method. An additional circuit for wireless charging, for example, a circuit such as a coil loop, a resonant circuit, or a rectifier circuit, can be added.

A battery gauge can measure the remaining amount of the battery 1296, or a voltage, current, or temperature of the battery 896 during charging. The battery 1296 can store or generate electricity and can supply power to the electronic device 1200 by using the stored or generated electricity. The battery 1296, for example, can include a rechargeable battery or a solar battery.

The indicator 1297 can display a specific state of the electronic device 1200 or part thereof (for example, the AP 1210), for example, a booting state, a message state, or a charging state. The motor 1298 can convert electrical signals into mechanical vibration. Although not shown in the drawings, the electronic device 1200 can include a processing device (for example, a GPU) for mobile TV support. The processing device for mobile TV support can process media data according to the standards such as digital multimedia broadcasting (DMB), digital video broadcasting (DVB), or media flow.

As mentioned above, an image data processing electronic device and method can control preview image data without directly manipulating an electronic device by a user by checking the movement of a pointing object set in the preview image data obtained from a camera.

Additionally, an image data processing electronic device and method can obtain final image data having an effect that a user wants by controlling preview image data according to the movement of a pointing object set in the preview image data obtained from a camera.

Each of the above-mentioned components of the electronic device according to this disclosure can be configured with at least one component and the name of a corresponding component can vary according to the kind of an electronic device. The electronic device according to this disclosure can be configured including at least one of the above-mentioned components. Moreover, some components can be omitted or additional other components can be further included. Additionally, some of components of an electronic device according this disclosure can be configured as one entity, so that functions of previous corresponding components can be performed identically.

The term "module" used in this disclosure, for example, can mean a unit including a combination of at least one of hardware, software, and firmware. The term "module" and the term "unit", "logic", "logical block", "component", or "circuit" can be interchangeably used. "module" may be a minimum unit or part of an integrally configured component. "module" may be a minimum unit performing at least one function or part thereof. "module" may be implemented mechanically or electronically. For example, "module" according to this disclosure may include at least one of an application-specific integrated circuit (ASIC) chip performing certain operations, field-programmable gate arrays (FPGAs), or a programmable-logic device, all of which are known or to be developed in the future.

According to various embodiments, at least part of a device (for example, modules or functions thereof) or a method (for example, operations) according to this disclosure, for example, as in a form of a programming module, can be implemented using an instruction stored in computer-readable storage media. When at least one processor executes an instruction, it can perform a function corresponding to the instruction. The computer-readable storage media can include a memory, for example. At least part of a programming module may be implemented (for example, executed) by a processor, for example. At least part of a programming module can include a module, a program, a routine, sets of instructions, or a process to perform at least one function, for example.

The computer-readable storage media can include Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction (for example, a programming module) such as Read Only Memory (ROM), Random Access Memory (RAM), and flash memory. Additionally, a program instruction can include high-level language code executable by a computer using an interpreter in addition to machine code created by a complier. The hardware device can be configured to operate as at least one software module to perform an operation of this disclosure and vice versa.

A module of a programming module according to this disclosure can include at least one of the above-mentioned components or additional other components. Or, some programming modules can be omitted. Operations performed by a module, a programming module, or other components according to this disclosure can be executed through a sequential, parallel, repetitive or heuristic method. Additionally, some operations can be executed in a different order or can be omitted. Or, other operations can be added.

Although the present disclosure has been described with an exemplary embodiment, various changes and modifications can be suggested to one skilled in the art. It can be intended that the present disclosure encompass such changes and modifications as fall within the scope of the appended claims.

What is claimed is:

1. An electronic device for processing image data, the device comprising:
an image sensor configured to obtain the image data; and
one or more processors configured to:
select at least one pointing object according to whether the at least one pointing object is stored, wherein when the at least one pointing object is not stored, the one or more processors are configured to select an actual object as the at least one pointing object by:
analyzing the image data obtained while a movement does not occur substantially in the image date;
comparing the image data with a previous image; and
extracting the at least one pointing object from the image data based on an identification that the actual object does not exist in the previous image but exists in the image data; and
control the image data according to a position and movement of the at least one pointing object.

2. The electronic device according to claim 1, wherein the one or more processors are further configured to set the at least one pointing object in the image data.

3. The electronic device according to claim 2, wherein the one or more processors are further configured to set the at least one pointing object in at least one pre-stored pointing object.

4. The electronic device according to claim 2, further comprising an input device configured to select at least one object from the image data, wherein the one or more processors are further configured to set the selected at least one object as the at least one pointing object when a movement does not occur in the image data.

5. The electronic device according to claim 2, wherein, after at least one change in the position and movement of the at least one pointing object is detected in a space for obtaining the image data, the one or more processors are further configured to control the image data through a function including at least one of cropping, zoom-in, zoom-out, partial zoom-in, partial zoom-out, partial removal, out-focusing, composite, distortion, and augmented reality in accordance to the at least one change.

6. The electronic device according to claim 2, wherein the one or more processors are further configured to set a coordinate value of the at least one pointing object in a space for obtaining the image data.

7. The electronic device according to claim 2, wherein, in response to identifying food in the image data, the one or more processors are further configured to:
check a type and amount of food to which the at least one pointing object points; and
calculate a total calorie count.

8. An image data processing method, comprising:
obtaining image data;
selecting at least one pointing object according to whether the at least one pointing object is stored, wherein when the at least one pointing object is not stored, selecting an actual object as the at least one pointing object by:
analyzing the image data obtained while a movement does not occur substantially in the image data;
comparing the image data with a previous image; and
extracting the at least one pointing object from the image data based on an identification that the actual object does not exist in the previous image but exists in the image data;
extracting an object corresponding to a position of at least one pointing object from the image data;
checking at least one of a position or a movement of the at least one pointing object; and
controlling and outputting image data corresponding to the extracted object according to the check result.

9. The method according to claim 8, further comprising:
after the obtaining of the image data, setting the at least one pointing object in the obtained image data.

10. The method according to claim 9, wherein the setting of the at least one pointing object comprises setting the at least one pointing object in at least one pre-stored pointing object.

11. The method according to claim 9, wherein the setting of the at least one pointing object further comprises receiving a select signal on at least one object among at least one object included in the image data and setting an object corresponding to the select signal as the at least one pointing object.

12. The method according to claim 8, wherein the controlling and outputting of the image data comprises, after at least one change in a position and movement of the at least one pointing object in a space for obtaining the image data, controlling the image data through a function including at least one of cropping, zoom-in, zoom-out, partial zoom-in, partial zoom-out, partial removal, out-focusing, composite, distortion, and augmented reality in correspondence to the at least one change.

13. The method according to claim 9, wherein the setting of the at least one pointing object comprises setting a coordinate value of the at least one pointing object in a space for obtaining the image data.

14. The method according to claim 8, wherein the controlling and outputting of image data comprises, in response to food being identified in the image data, checking a type and amount of food that the at least one pointing object points to and calculating and outputting a total calorie count by controlling and outputting the image data.

15. The electronic device according to claim 1, wherein the at least one pointing object comprises a finger or a stylus.

16. The electronic device according to claim 1, wherein the one or more processors are further configured to apply an auto-focusing effect when the at least one pointing object taps an arbitrary position in a specific space.

17. The method according to claim 8, wherein the at least one pointing object comprises a finger or a stylus.

18. The method according to claim 8, further comprising applying an auto-focusing effect when the at least one pointing object taps an arbitrary position in a specific space.

19. An electronic device for processing image data comprising:
 an image sensor configured to obtain image data; and
 one or more processors configured to control the image data according to a position and movement of at least one pointing object; and
 wherein when the at least one pointing object moves closer to or farther away from the image sensor, the one or more processors are further configured to perform a control to zoom-in or zoom-out image data corresponding to an area that the at least one pointing object points to according to a change in a coordinate value resulting from the movement of the at least one pointing object.

20. An image data processing method comprising:
 obtaining, by an image sensor, image data;
 extracting an object corresponding to a position of at least one pointing object from the image data;
 checking at least one of a position and movement of the at least one pointing object; and
 controlling and outputting image data corresponding to the extracted object according to the check result,
 wherein the controlling of the image data comprises, when the at least one pointing object moves closer to or farther away from the image sensor, performing a control to zoom-in or zoom-out image data corresponding to an area that the at least one pointing object points to according to a change in a coordinate value resulting from the movement of the at least one pointing object and output the image data.

\* \* \* \* \*